April 1, 1969  M. MAYRATH  3,435,941
HINGED-HOPPER AUGER CONVEYOR
Filed Feb. 13, 1967  Sheet 1 of 2

INVENTOR
MARTIN MAYRATH
BY Homer R. Montague
ATTORNEY

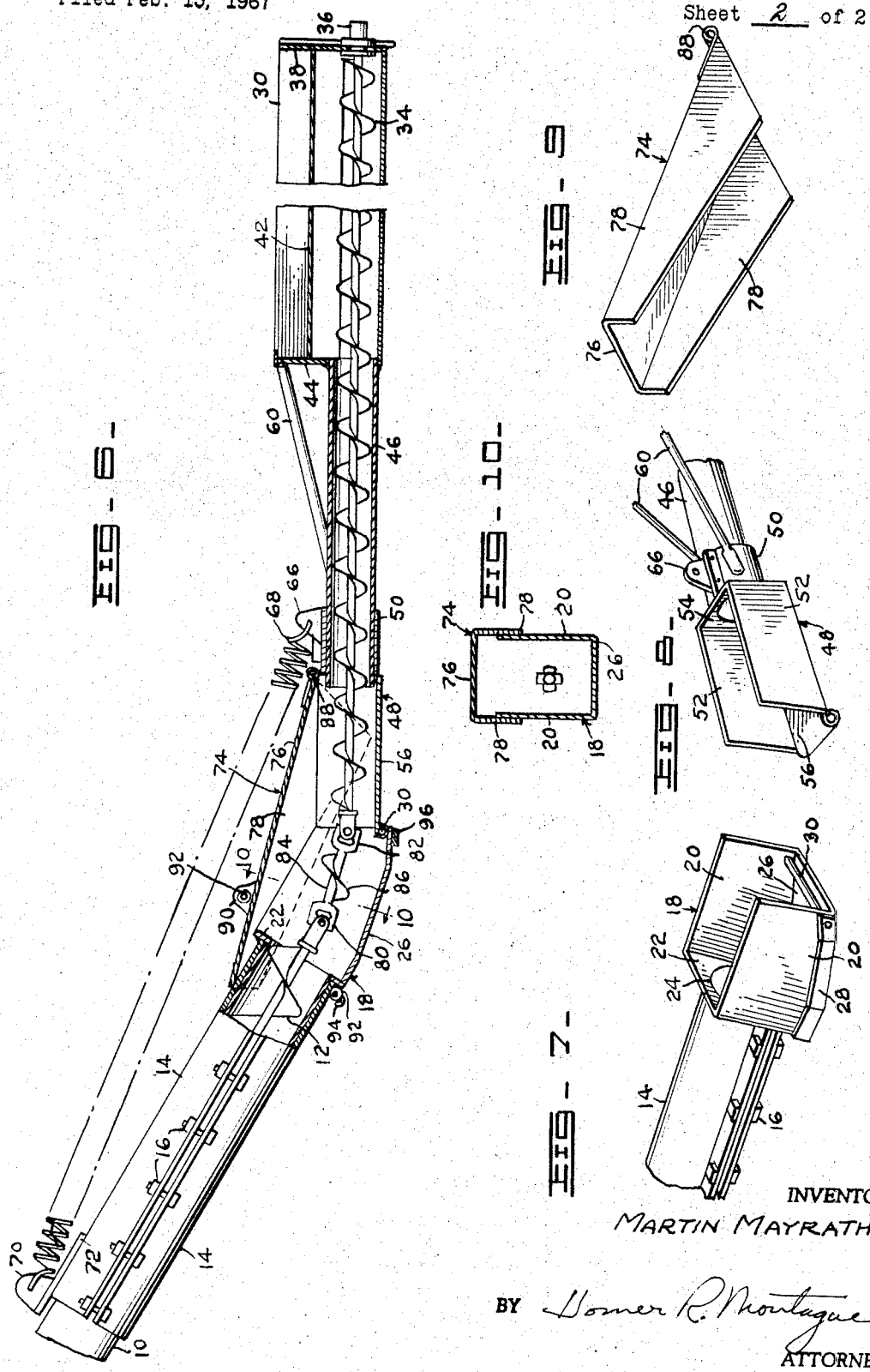

United States Patent Office 3,435,941
Patented Apr. 1, 1969

3,435,941
HINGED-HOPPER AUGER CONVEYOR
Martin Mayrath, 10707 Lennox Lane,
Dallas, Tex. 75229
Filed Feb. 13, 1967, Ser. No. 615,684
Int. Cl. B65g 33/14, 21/12
U.S. Cl. 198—87      7 Claims

ABSTRACT OF THE DISCLOSURE

A conveyor of the auger type having a main auger conveyor tube to which is pivotally attached, at its lower (inlet) end, a collecting hopper unit having an auxiliary auger conveyor powered from the main auger drive. The main conveyor tube and the hopper unit are connected for material flow by respective interfitting trough-like members with overlapping side walls, which are pivoted to one another along a bottom edge of each to maintain an imperforate channel for the material in all pivoted positions of the hopper unit, and a cover member is pivotally and slidably mounted with respect to the respective trough-like members to effectively close the flow channel in all of such positions.

---

This invention relates to a hinged-hopper arrangement for a conveyor of the auger type commonly used for conveying grain and the like from a low point to a higher point, to be discharged into bins, lofts or at other desired discharge points.

It is a fairly common practice to provide an auger conveyor of this type with a collecting hopper connected to its lower (inlet) end, so as to receive grain or the like from trucks, grain being fed by an auxiliary auger from the hopper to the lower end of the main conveyor.

It is highly desirable that the hopper be hinged to swing upwardly to facilitate the positioning of a truck or wagon for unloading into the hopper. If the hopper is stationary on the ground, it is necessary to drive the truck around the hopper, and then back it up into proper position for unloading. Frequently it is difficult for the driver to see the hopper, particularly if he approaches the latter with his seat at the opposite side from the main conveyor. Much damage results from this problem.

In apparatus of this kind, it has been proposed to use hoppers that are hinged so that they may be swung upwardly to allow a truck to drive directly behind the main conveyor, after which the hopper is lowered onto the ground behind the truck. However, because of the nature of the connections that have been proposed (so that, for example, the hopper's own auger may be driven from the main conveyor), these arrangements have not been practical where the main auger conveyor is set at a fairly high angle above the horizontal.

Where the truck that is being unloaded is a dump-body type, the rear end will be lowered substantially when the body is tilted, and may engage the hopper side walls and damage them. Hence, a very low hopper profile is desirable, and it is also desirable that the hopper assembly be long enough to provide ample room for maneuvering the truck into a suitable position, and wide enough to enable the hopper to receive considerable grain or the like even though it has this low vertical height of side walls.

It is therefore an important object of this invention to provide a hinged-hopper conveyor wherein the hopper, even though up to eight feet long (to provide ample maneuvering room) may be swung upwardly at least to a vertical position, notwithstanding that the auger conveyor is itself at an angle as high as 45 or 50 degrees above the horizontal, thus facilitating the placing of the truck by driving straight past the up-swung hopper, which is then lowered behind the truck.

A further object is to provide novel connecting means between the hopper and the main conveyor to permit this up-swinging motion, wherein the connecting or transition region is sealed against overflowing or leakage of the grain or other material being conveyed, regardless of the angular relationship between the hopper and the conveyor. In particular, the invention obviates the need for flexible boots or the like between the hopper and the conveyor, such boots being subject to early deterioration and also usually tending to impede the flow of grain, especially when through ageing or use they become distorted and do not provide a clear channel of adequate cross-section.

A further object of the invention is to provide conveyor-carried and hopper-carried connecting members for conveying grain or the like from the hopper to the conveyor, which members are connected together in a simple and rugged manner which permits the necessary upward swing of the hopper, and to provide a novel form of cover for these connecting members, to prevent escape of the grain without impeding the desired swinging movement of the hopper.

Another object of the invention is to provide a cover member as just described which, in connection with the hinged connection members, will prevent leakage of grain or the like even when the main conveyor is inclined at a high angle above the horizontal, and yet will allow grain to spill out if an excessive pressure condition is reached, to prevent damage to the parts in the event the passage through the main conveyor should become blocked or jammed.

A further object of the invention is to provide a pretensioned counter-balancing spring between the main conveyor and the hopper so as to carry a substantial portion of the weight of the latter as it is raised and lowered, and such that the coil turns of the spring, when completely relaxed (hopper raised), will engage one another to limit over-swinging movement of the hopper and thus prevent damage to the hinge and other parts.

Yet another object of the invention is to provide a connection for a loading hopper which will enable dispensing with several expensive (and vulnerable) bearings heretofore required to be located in the grain path, and also dispensing with their supporting spiders or brackets, all of which tend to impede the flow of the conveyed material and restrict the conveyor from operating at its full rated capacity.

Other objects and advantages of the invention will become apparent during the course of the following description, which is directed to a single preferred embodiment of the invention, and is to be read in connection with the appended drawings, in which:

FIG. 6 is a longitudinal sectional view of the apparatus, parts of the main conveyor being broken away, and parts being shown in section.

FIG. 7 is a perspective view of the rear end of the conveyor and the connecting member associated therewith.

FIG. 8 is a similar view of the forward end of the hopper tube and the connecting member associated therewith.

FIG. 9 is a perspective view of the slidable cover for the connecting members.

FIG. 10 is a transverse section taken along line 10—10 of FIGURE 6.

Figure 1:
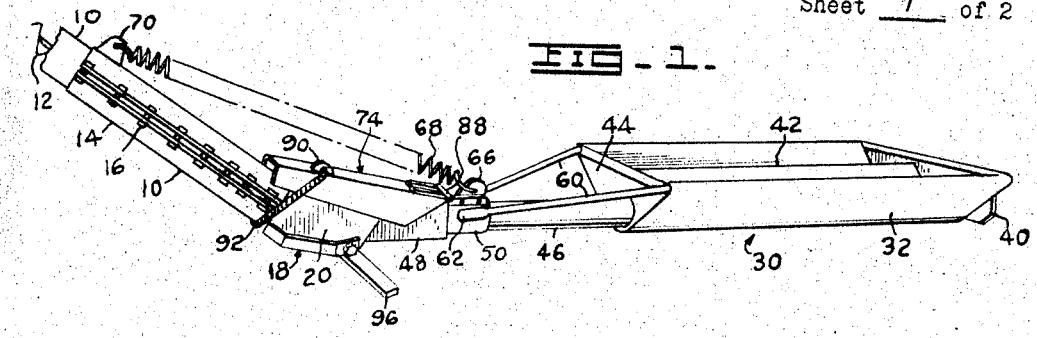
FIG. 1 is a perspective view from one side of the assembled apparatus, portions of the main conveyor auger and tube being broken away to permit a larger scale.
Figure 2:
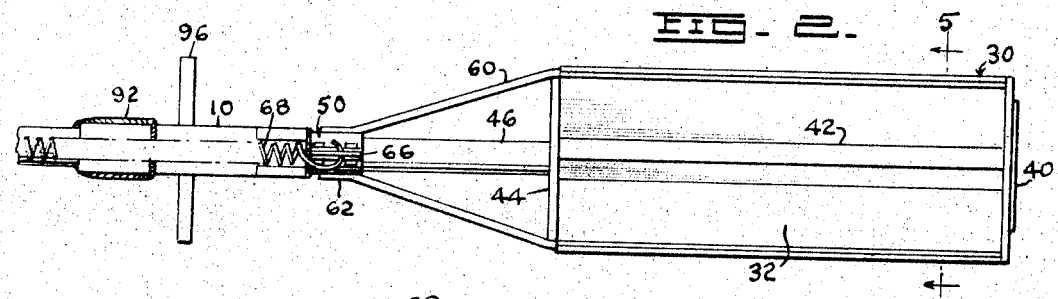
FIG. 2 is a plan view of the same, to a somewhat larger scale.

In the drawings, numeral 10 designates a conventional auger conveyor tube having a screw or auger conveyor 12 therein for conveying grain or the like to the upper end of the conveyor for discharge wherever desired. The lower end portion of the tube 10 is preferably reinforced by semicircular sleeves 14 bolted together as at 16.

The lower end of the conveyor tube 10 carries a connecting member indicated as a whole by the number 18; as detailed in FIG. 7, this is provided with parallel side walls 20 and a forward end wall 22, the latter having an opening 24 communicating with the auger conveyor 10, 12, to supply material thereto. The member 18 is also provided with a bottom wall 26, the edges of which are turned up as at 28 and welded to the side walls 20. A shaft 30 projects through the side walls 20 near the bottom thereof and near the rear end of the wall 26, for a purpose to be described.

Rearwardly or to the right of the auger conveyor is arranged a hopper 30 (FIGURE 1) having downwardly and inwardly sloping walls 32, which merge to form the rounded bottom of the hopper. A screw auger 34 (see FIG. 6) passes just inside this rounded bottom, and its shaft is journalled solely in a bearing 36 carried by the end wall 38 of the hopper. This end wall is preferably reinforced by an end plate 40, which extends laterally of the hopper so as to provide a stabilizing action against tilting thereof. Within the hopper, and above the auger screw 34, is secured an inverted V-shaped guard 42, serving to protect the screw from damage, as well as to divide the material flowing from above into the hopper, and to feed it equally to both sides of the auger screw. The shaft of auger 34 is preferably slidable to a limited degree, in its end bearing 36, to accommodate the swinging action.

A conveyor tube 46 is welded at its rear end to the wall 44, the rear end of the tube thus opening into the bottom of the hopper as clearly shown in FIG. 6. The auger screw 34 extends through the tube 46 and through a connecting member 48 welded at its own rear end to a reinforcing sleeve 50 which surrounds the forward end of the tube 46.

As shown in FIG. 8, the connecting member 48 is provided with parallel side walls 52 and an end wall 54 opening into the tube 46 and through which the screw 34 (and optionally a part of the tube 46) protrude. These protruding parts are omitted from FIG. 8, for clarity. The width of member 48 between the outer faces of the walls 52 is slightly less than the width between the inner faces of walls 20 of the member 18 (FIG. 7). The left hand end of member 48 in FIGS. 6 and 8 is thus adapted to be received between the walls 20 of member 18. The member 48 is open at its top and it has a bottom wall 56 turned at the forward end into cylindrical shape to receive the shaft 30 and thus to pivotally connect the members 18 and 48 as shown in FIG. 6. It will be noted that as a result of the way in which these parts are pivoted relative to one another, there is no downward opening for loss of grain or the like passing along the connecting member; also, that the two connecting members can be swung through a large angle relative to one another.

Figure 5:
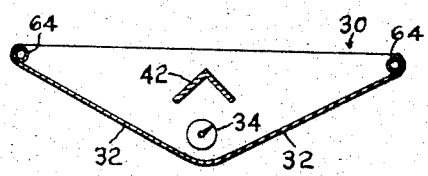
FIG. 5 is a transverse section taken on line 5—5 of FIG. 2.

The hopper 30 and tube 46 are effectively fixed with respect to each other by braces 60, the forward ends 62 of which are welded to the reinforcing sleeve 50. These braces may in fact be constituted by rods or pipe sections which may extend rearwardly along and within the curled upper margins of the hopper walls as at 64 (FIG. 5) to render the entire hopper structure exceptionally rigid.

The reinforcing sleeve 50 carries an upper ear 66 to which is connected one end of a pretensioned tension spring 68, the other end of which is connected to an ear 70 carried by a plate 72 welded to the split reinforcing sleeve 14. In the position of the parts shown in FIG. 6, the spring 68 is extended, under tension, and acts to counterbalance most of the weight of the hopper 30 and associated parts. This hopper, therefore, though relatively heavy, can readily be manually swung upwardly about the axis of the pivot shaft 30.

As already stated, the tops of the connecting members 18 and 48 are open, but they are closed against the escape of grain or the like by a cover 74, shown in perspective in FIG. 9. This cover is provided with a solid top wall 76 and side walls 78, and the cover slidably fits over the side walls 20 of the connecting member 18 as shown in FIG. 10. The forward or left end of the top wall 76 of the cover slides along over the top of the split reinforcing sleeve 14, as shown in FIG. 6, when the angular relationship of the hopper to the main conveyor is altered.

The main conveyor auger 12 is power driven in any suitable or conventional manner, and the rotating main auger shaft delivers power to the hopper conveyor auger 34 through universal joints 80 and 82, the inner elements of which are connected by a rod or shank 84 provided with a section of a conveyor screw 86, to facilitate the flow of material through the connecting members.

It will be noted that the universal joint 82 is relatively close to the pivot axis 30, and accordingly the hopper will swing upwardly on this axis without material displacement of the rod or shank 84 and conveyor 12. Obviously, when the hopper is swung upwardly it is necessary to allow the cover 74 to swing upwardly also, and thus the cover is connected to the wall 54 by a hinge 88 of any desired type. It is preferred that the outer end of the cover 74 be biased downwardly to ensure contact between its free end and the split sleeve 14. To this end, the cover lid 76, at a point remote from hinge 88, is provided with an eye 90 through which passes a long, light-tension coil spring 92. This coil spring passes downwardly on opposite sides of the cover 74 and has its ends connected in any suitable manner to the bottom of split sleeve 14, for example by hooks 94. Regardless of the positions of the parts, the spring 92 always exerts a component of force perpendicular to the face of the wall 76 of the cover 74, thus maintaining the free end of the cover in sliding engagement with the upper part of the split sleeve 14.

Figure 4:
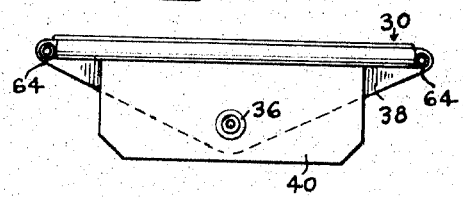
FIG. 4 is a rear end elevation of the hopper.

The plate 40 (FIG. 4) tends to stabilize the hopper to prevent it from rocking. In addition, it is preferred to provide what may be termed a "wind bar" 96 (FIGS. 1 and 3) welded to the member 18 and extending laterally beyond its sides, for further stabilization.

*Operation*

Figure 3:
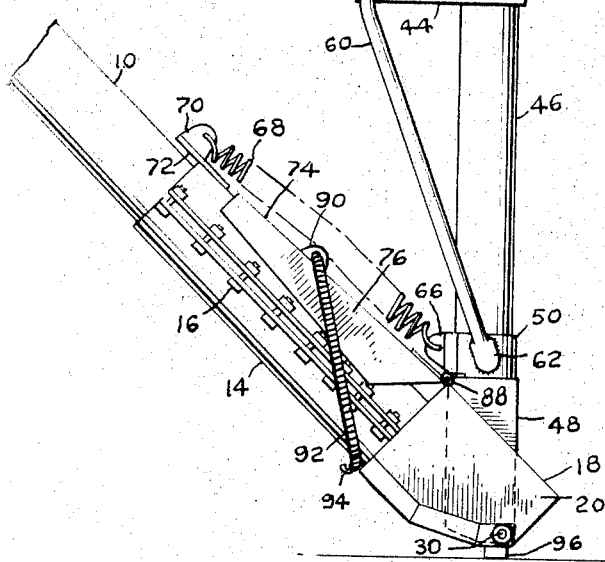
FIG. 3 is an enlarged fragmentary side elevation showing the positions of the parts when the conveyor is at an angle of 45 degrees (to horizontal) and the hopper is swung upwardly to the vertical position.

When the hopper portion of the apparatus is to be elevated, it is swung upwardly to or slightly beyond the vertical position as shown in FIG. 3. It will be noted that because of the use of two relatively hinged connecting members 18 and 48, generally trough-like in shape and hinged at their bottom edges, and in effect telescoping together, a relatively sharp angle is attainable between the tube 46 of the hopper and the main auger tube, without producing any opening through which grain or the like could spill. In this vertical position, the hopper assembly is entirely out of the path of a truck or the like which is driven transversely across the rear end of the main conveyor. With previously known arrangements, this degree of elevation could only be obtained when the main conveyor was at a relatively low angle to the horizontal, and even then, leakage of grain could only be prevented by some form of flexible cover or boot to seal the gaps.

When the hopper is in its raised position, the balancing spring 68 is relaxed so far as external tension is concerned, but its coils are forced snugly against one another (due to its pre-tension), and it acts as a fairly rigid strut, tending to prevent the hopper from swinging very far beyond the vertical; i.e., from falling towards the main conveyor with the consequent possibility of damage.

With the hopper assembly elevated, a truck or wagon can be driven close to the end of the main conveyor, on a transverse path, and past the position that is to be occupied by the hopper when lowered. The hopper is now lowered to the ground, most of its weight being neutralized by spring 68, and the truck can be unloaded thereinto by shovelling, tilting of the truck body, or in any desired way. Of course, the hopper is also available for use without a truck, and serving as a conventional feeder for the main conveyor.

The conventional drive for the main auger screw 12 is transmitted through the shank section 84 (with its auxiliary helical screw section 86) and to the hopper auger 34 by the universal joints. It is especially emphasized that the passageway through the connecting members 18 and 48 is entirely free from obstructions. Since these members are securely hinged to one another by the shaft 30, the geometrical relationships are maintained without the need for any lower bearing (and its conventional spider) for the main auger 12, and without the need for any bearing (and spider or other supports) for the hopper auger 34, other than the outboard bearing 36 at the rearmost face of the hopper. No flexible rubber or leather boot is required, such as might allow its free end to droop into the path of the grain being conveyed.

If the main conveyor become clogged, material collecting in members 18 and 48 will exert an upward force on the cover 74, and it will ultimately swing upward, to relieve the pressure, before any damage can be done to the apparatus. Otherwise, the cover will be held in its normal closed position by the spring 92.

The inventive combination has been described herein in such detail as to allow those skilled in the art to practice and understand the invention, but many changes can be made in the details disclosed, without departing from the spirit of the invention or the scope of the appended claims.

What is claimed is:

1. A hinged hopper conveyor structure comprising a main conveyor tube having a conveyor auger therein, a hopper structure having a conveyor auger therein, a first trough-like connecting member carried by said main conveyor, a second trough-like connecting member carried by said hopper structure, said connecting members having open tops and being nested with one at least partially within the other, hinge means pivotally connecting said connecting members to each other along a bottom edge of each for upward swinging movement of said hopper structure, and a cover extending over said connecting members and closing the tops thereof, said cover being hinged at one end to said hopper structure and having its other end slidable over said main conveyor tube to move thereover when said hopper structure is swung upwardly or downwardly relative to said main conveyor tube.

2. A structure in accordance with claim 1, wherein said connecting members have flat parallel side walls, the side walls of one connecting member being slidable against the respective inner faces of the side walls of the other connecting member, said cover having side walls extending downwardly over the side walls of said connecting members, and being of sufficient depth to close the tops of said connecting members in any turned position of said hopper structure relative to said main conveyor tube.

3. A structure according to claim 1 provided with a pretensioned coiled counterbalancing spring connected at one end to said hopper structure and at its other end to said main conveyor tube to assist in supporting the weight of said hopper structure as the latter is swung upwardly or downwardly relative to the main conveyor tube, the coils of said spring, when relaxed, being in rigid engagement with each other when said hopper structure is in a substantially vertical position, to limit over-swinging movement of said hopper structure substantially beyond such position.

4. A structure according to claim 1, provided within said first connecting member with a shank having universal joints at its ends connecting said augers, one of said universal joints being positioned closed to the axis of said hinge means.

5. A hinged hopper conveyor comprising a main conveyor having an auger therein, an open hopper, a tube connected at one end of said hopper and projecting longitudinally therefrom, a screw conveyor extending through said tube, a first connecting member carried by said main conveyor, a second connecting member carried by the end of said tube remote from said hopper and through which said screw conveyor extends, said connecting members having open tops, a horizontal pivot shaft extending transversely of said members and pivotally connecting them together whereby said hopper and said tube and said second member are adapted to swing upwardly above the axis of said shaft, a shank arranged in said connecting members, universal joints connecting the respective ends of said shank to said screw conveyor and to said auger, and a cover arranged above and closing the tops of said connecting members and movable relative thereto to accommodate upward swinging movement of said hopper, said tube and said second connecting member from a lower operative position to an upper inoperative position.

6. A structure according to claim 5 wherein said cover is provided with side walls extending downwardly beyond the open tops of said connecting members, said cover being pivotally connected at one end to said tube and having its other end slidable over said main conveyor structure.

7. A structure according to claim 5 provided with a helical conveyor section surrounding said shank to assist in moving material from said tube and from said second connecting member through said first connecting member to said main conveyor.

References Cited

UNITED STATES PATENTS

| 796,477 | 8/1905 | Wallace | 198—99 X |
| 2,800,238 | 7/1957 | Oliver | 198—64 X |
| 3,175,676 | 3/1965 | Vander Schaaf | 198—114 |
| 3,328,090 | 6/1967 | Whisler et al. | 198—115 X |

EDWARD A. SROKA, *Primary Examiner.*

U.S. Cl. X.R.

198—94, 115